Nov. 29, 1966 K. Y. JABBAR 3,288,936
FREQUENCY MODULATION MULTIPLEX RECEIVER USING A VISUAL INDICATOR TO CONTROL LOCAL OSCILLATOR
Filed Oct. 6, 1964
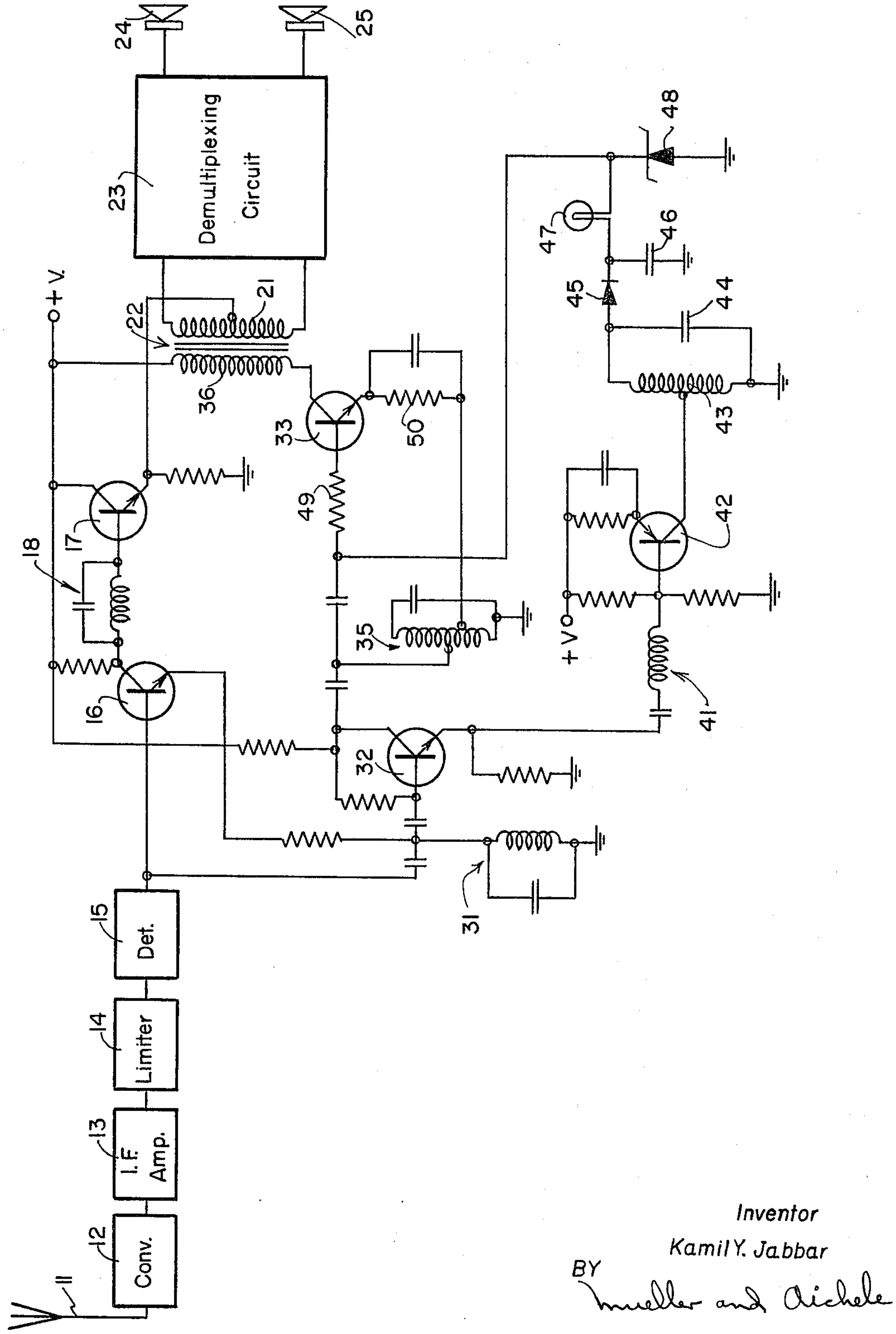
Inventor
Kamil Y. Jabbar
BY Mueller and Aichele
Attys.

3,288,936

FREQUENCY MODULATION MULTIPLEX RECEIVER USING A VISUAL INDICATOR TO CONTROL LOCAL OSCILLATOR

Kamil Y. Jabbar, Chicago, Ill., assignor to Motorola, Inc., Franklin Park, Ill., a corporation of Illinois
Filed Oct. 6, 1964, Ser. No. 401,809
4 Claims. (Cl. 179—15)

This invention relates to frequency modulation multiplex receivers, and more particularly to an indicator and control circuit for such a receiver.

In frequency modulation (FM) multiplex broadcasting, the 38 kc. carrier signals are suppressed at the transmitter to avoid transmitting a large signal that carries no information. Accordingly, a multiplex receiver is designed to produce carrier signals in the correct phase relationship with the suppressed carrier signals at the transmitter. This relationship is maintained by use of a pilot signal of 19 kc. frequency which is transmitted with the multiplex signals.

One method of producing carrier signals at the receiver is by utilizing a local oscillator in the receiver which oscillates at the carrier frequency and which is synchronized with the 19 kc. signals. In receivers having a power supply which is subject to variation in voltage, such as is the case with vehicular power supplies, difficulty may be encountered in preventing variation in the output of a local oscillator due to variation in the bias voltage therefor. This can result in unsatisfactory operation during multiplex reception and makes it difficult to insure that the local oscillator is not operating during non-multiplex reception.

It is desirable that the local oscillator not operate during reception of non-multiplex signals because if it does operate during such reception, noise and distortion result due to interaction of oscillator output with the received signals. It is also desirable to provide for visual indication of the presence or absence of multiplex signals. With respect to this latter feature, however, transistorized receivers present difficulties in obtaining sufficient voltage to operate an indicator light because of the low operating voltages present in the transistor receiver.

Accordingly, it is an object of this invention to provide an improved circuit for controlling the operation of a local oscillator in a frequency modulation multiplex receiver, and for providing an indication of the presence or absence of multiplex signals in the receiver.

Another object of the invention is to provide a low cost circuit of simple design and few components for controlling the operation of a local oscillator in a frequency modulation multiplex receiver and for providing an indication of the presence or absence of multiplex signals, which circuit is especially adapted for use in transistorized receivers used in vehicles.

A feature of the invention is the provision, in a frequency modulation multiplex receiver, of a neon bulb and a reverse poled zener diode series connected to form a voltage divider for rectified multiplex pilot signals to provide constant bias for the local oscillator when multiplex signals are being received.

Another feature of the invention is the provision of a circuit for detecting, amplifying and rectifying multiplex pilot signals in a transistorized frequency modulation multiplex receiver, and the provision in such a circuit of a series connected neon bulb and reverse poles zener diode with the juncture between the two being connected to bias the base of a transistor in the local oscillator.

The single figure of the drawing is a schematic diagram of a frequency modulation multiplex receiver incorporating the invention.

In accordance with the invention, a frequency modulation receiver capable of receiving multiplex and non-multiplex signals is provided with an indicator and control circuit. The receiver includes a local oscillator operable upon the application of a given bias voltage thereto for producing carrier signals representative of the suppressed carrier signals at the transmitter. The indicator and control circuit includes a resonant circuit tuned to the frequency of the multiplex pilot signals, and a transistor amplifier having a base region connected to the resonant circuit. A rectifier is connected to the transistor amplifier for rectifying the detected and amplified pilot signals. A neon bulb and a reverse poled zener diode are series connected in stated order from the rectifier to a reference potential. The zener diode provides a constant voltage drop thereacross when in reverse conduction. The juncture between the neon bulb and the zener diode is coupled to the local oscillator to supply operating bias voltage thereto according to the voltage drop across the zener diode in the presence of rectified pilot signals conducted through the neon bulb. In the absence of rectified pilot signals, the neon bulb presents a high resistance to prevent reverse conduction through the zener diode, thereby removing bias voltage from the local oscillator.

Referring now to the drawing, a particular form of the invention is shown. A frequency modulation multiplex receiver includes an antenna 11 connected to a converter 12 and an intermediate frequency amplifier 13. Signals from intermediate frequency amplifiers 13 are clipped in limiter 14 and applied to detector 15, which converts the frequency modulated intermediate frequency signals to unmodulated audio frequency signals. These unmodulated audio frequency signals, in the case of multiplex reception, include the right plus left and right minus left composite signals, the higher frequency background music signals, and a 19 kc. pilot signal.

The unmodulated output of detector 15 is applied to the base of a transistor amplifier 16. The output of transistor 16 is applied to the base of transistor amplifier 17 through a 67 kc. trap 18, which traps the background music signals. Transistor 17 has an emitter electrode coupled to the center tap of the secondary winding 21 of a transformer 22. Secondary winding 21 is connected at each end to a demultiplexing circuit 23. Demultiplexing circuit 23 is of the switching demodulator type, well known in the art. An example of such a circuit is shown in the magazine Electronics World, January 1962 in an article Crowhurst, entitled "FM Multiplex Stereo Detection Methods." In addition to deriving the right and left channel signals from multiplex signals applied thereto, the demultiplexing circuit 23 will also pass non-multiplex audio signals to speakers 24 and 25.

As is well known in the art, in order for demultiplexing circuit 23 to derive the right and left channel components from the mltiplex signal applied thereto, the carrier signals suppressed at the transmitter are restored in the receiver and applied to the demultiplexing circuit through transformer 22. In order to restore the suppressed carrier signals in proper phase with the composite multiplex signals, the 19 kc. pilot signals are utilized. These 19 kc. pilot signals are detected by tuner circuit 31 and applied to the base of transistor 32. The output of transistor 32 is coupled to the base of transistor 33. Transistor 33 is coupled to a feedback circuit including tuned circuit 35, which is tuned to 38 kc. or the first harmonic of the 19 kc. output of transistor 32. Accordingly, transistor 33 will provide oscillations at the 38 kc. frequency of the suppressed carrier in proper phase, which signals are applied to the primary winding 36 of transformer 22 and from there to the secondary winding 21 and to demultiplexing circuit 23.

Bias for the local oscillator including transistor 33 is supplied through an indicator and control circuit. This circuit includes a 19 kc. filter 41 connected to the emitter of transistor 32. When multiplex signals are being received, some of the 19 kc. pilot signals will therefore be detected by tuned circuit 41 and applied to the base of transistor 42. Transistor 42 is connected to the center tap of a winding 43, which together with capacitor 44, is also tuned to 19 kc. for increased selectivity. These amplified 19 kc. signals are then rectified in diode 45 and filtered by capacitor 46. A neon bulb 47 and a reverse poled zener diode 48 are series connected from the output of diode 45 to a reference potential or ground. The junction between neon bulb 47 and zener diode 48 is connected through a resistor 49 to bias the base of transistor 33. Resistor 50 completes the bias circuit.

When multiplex signals are being received, the 19 kc. pilot signals amplified by transistor 42 and rectified by diode 45 will be of sufficient magnitude to cause neon bulb 47 to light. As is characteristic of neon bulbs, the resistance presented by bulb 47 will drop once the bulb lights and will place sufficient voltage across zener diode 48 to break down the zener diode an cause reverse conduction. The voltage drop across the zener diode 48 during reverse conduction will remain constant, thereby applying a constant voltage bias to transistor 33. This is particularly significant when the variation in voltage at the supply may be great, such as in automobiles and similar vehicles. Furthermore, transistor 42 provides sufficient amplification to cause the oscillator to operate even though the received signal may be quite weak. In addition, the constant voltage drop across zener diode 48 assures a constant output of the oscillator transistor 33 so that constant channel separation results.

When non-multiplex signals are being received, the voltage impressed on neon bulb 47 will be insufficient to cause the bulb to light. Accordingly, the bulb presents a very high resistance in the circuit and zener diode 48 will not conduct in the reverse direction. Since no forward bias is applied to transistor 33, the local oscillator will not operate, insuring accurate reproduction of non-multiplex signals. Neon bulb 47, of course, may be mounted in the control panel of the receiver to give an indication of the presence or absence of multiplex signals.

It may therefore be seen that the invention provides an improved circuit for controlling the operation of a local oscillator in a frequency modulation multiplex receiver, and for providing an indication of the presence or absence of multiplex signals. The circuit is low in cost, is of simple design and contains few components. The invention has particular adaptation for use in transistorized receivers, especially where the source voltage may vary, as in vehicular receivers.

I claim:

1. An indicator and control circuit for a frequency modulation receiver capable of receiving multiplex and non-multiplex signals and having a local oscillator operable upon the application of a given bias voltage thereto for producing carrier signals representative of the suppressed carrier signals at the transmitter, said indicator and control circuit including in combination, circuit means for detectng and amplifying the multiplex pilot signals upon receipt of multiplex signals by the receiver, rectifier means connected to said circuit means for rectifying the pilot signals detected and amplified thereby, a neon bulb and a reverse poled zener diode connected in series to said rectifier means, and conducting rectified pilot signals therefrom, said zener diode having a given voltage drop thereacross when in reverse conduction, and conductor means for connecting the local oscillator across said zener diode to supply operating bias voltage thereto according to the given voltage drop across said zener diode in the presence of rectified pilot signals conducted through said neon bulb, said neon bulb presenting a high resistance in the absence of rectified pilot signals to prevent reverse conduction through said zener diode thereby removing bias voltage from the local oscillator.

2. The combination of claim 1 wherein said circuit means include a resonant circuit tuned to the frequency of the multiplex pilot signals and a transistor amplifier having a base region connected to said resonant circuit.

3. An indicator and control circuit for a transistorized frequency modulation receiver capable of receiving multiplex and non-multiplex signals and having a local transistor oscillator operable upon the application of a given bias voltage thereto for producing carrier signals representative of the suppressed carrier signals at the transmitter, said indicator and control circuit including in combination, resonant circuit means for detecting the multiplex pilot signal upon receipt of multiplex signals by the receiver, a transistor amplifier connected to said resonant circuit means for amplifying the signals detected thereby, rectifier means coupled to said transistor amplifier for rectifying the pilot signal amplifier thereby, a neon bulb and a reverse poled zener diode series connected in stated order from said rectifier means to a reference potential, said zener diode having a given voltage drop thereacross when in reverse conduction, and conductor means for connecting the juncture between said neon bulb and said zener diode to the local oscillator to supply operating bias voltage thereto according to the given voltage drop across said zener diode in the presence of rectified pilot signals conducted through said neon bulb, said neon bulb presenting a high resistance in the absence of rectified pilot signals to prevent reverse conduction through said zener diode thereby removing bias voltage from the local oscillator.

4. A frequency modulation receiver capable of receiving multiplex and non-multiplex signals, including in combination, receiver means providing unmodulated audio signals, amplifier means connected to said receiver means for amplifying the output thereof, a switching demodulator circuit coupled to said amplifier means for separating the respective channel components of multiplex signals, first tuned circuit means connected to said receiver means for detecting the multiplex pilot signals upon receipt of multiplex signals by said receiver means, an oscillator connected to said first tuned circuit means for oscillating at the frequency of and in phase with the pilot signals detected thereby, said oscillator including a first transistor coupled to said demodulator circuit and having second tuned circuit means coupled thereto and tuned to the frequency of the suppressed carrier signals at the transmitter for producing carrier signals of proper phase for said demodulator circuit, third tuned circuit means coupled to said oscillator for tapping off a portion of the multiplex pilot signals, a second transistor connected to said third tuned circuit means for amplifying the multiplex pilot signals, rectifier means coupled to said second transistor for rectifying the amplified pilot signals, a neon bulb and a reverse poled zener diode series connected in stated order from said rectifier means to a reference potential, said zener diode having a given voltage drop thereacross when in reverse conduction, and a conductor connecting the junction between said neon bulb and said zener diode to the base region of said first transistor to supply operating bias voltage thereto according to the given voltage drop across said zener diode in the presence of rectified pilot signals conducted through said neon bulb, said neon bulb presenting a high resistance in the absence of rectified pilot signals to prevent reverse conduction through said zener diode thereby removing bias voltage from said first transistor.

References Cited by the Examiner

UNITED STATES PATENTS

| | | | |
|---|---|---|---|
| 3,116,372 | 12/1963 | Wolff | 179—15 |
| 3,187,102 | 6/1965 | Gschwandtner | 179—15 |
| 3,219,760 | 11/1965 | Loughlin | 179—15 |

DAVID G. REDINBAUGH, *Primary Examiner.*

ROBERT L. GRIFFIN, *Examiner.*